Sept. 28, 1943.  E. M. CLAYTOR  2,330,407
OVERDRIVE CONTROL SYSTEM
Filed Aug. 16, 1939  3 Sheets-Sheet 1

INVENTOR
Edward M. Claytor
BY
Spencer Hardman & Fehr
his ATTORNEYS

Sept. 28, 1943.  E. M. CLAYTOR  2,330,407
OVERDRIVE CONTROL SYSTEM
Filed Aug. 16, 1939   3 Sheets-Sheet 3
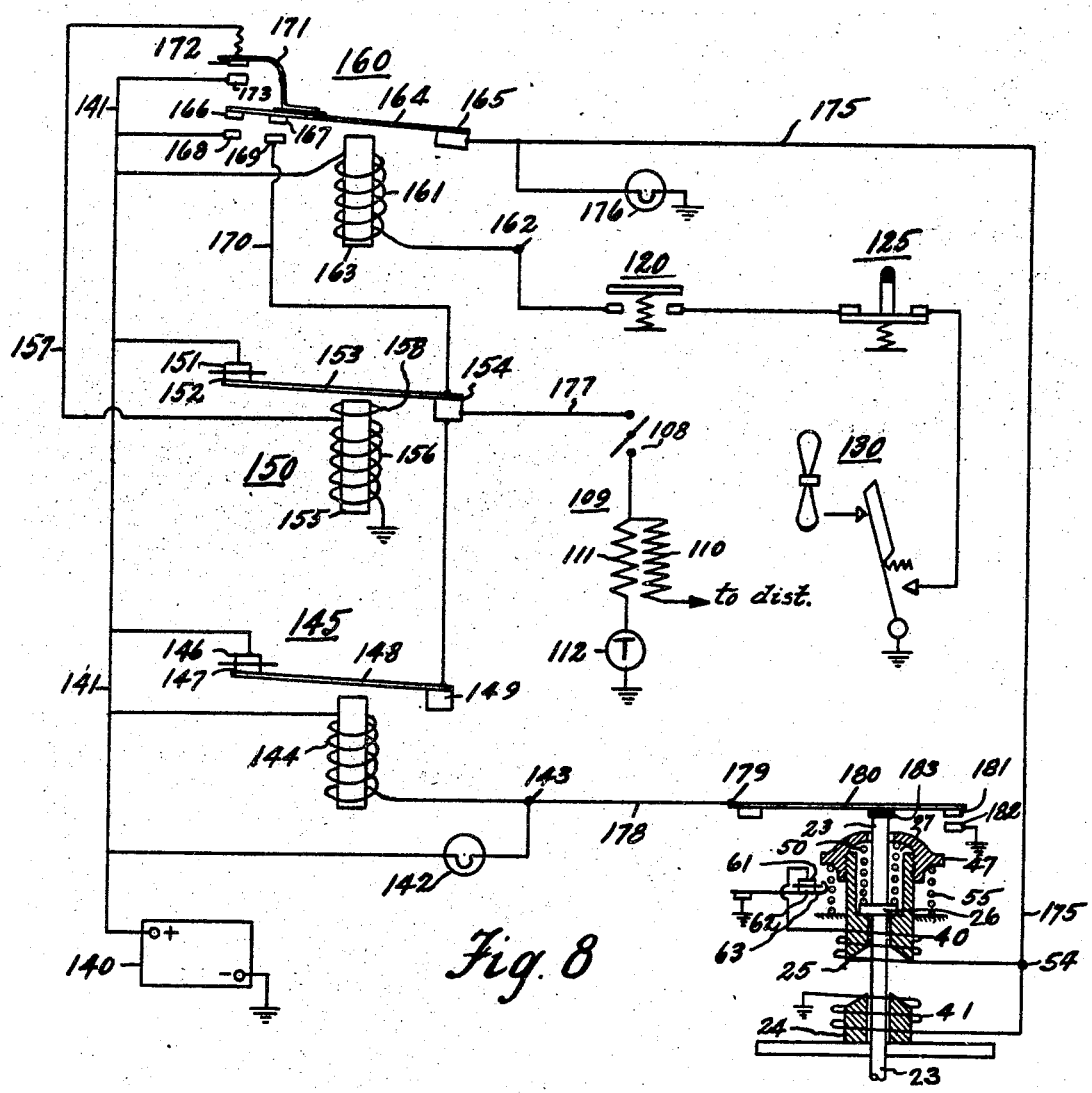
Fig. 8
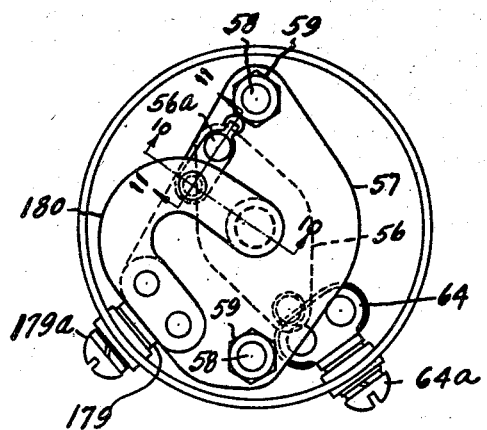
Fig. 9
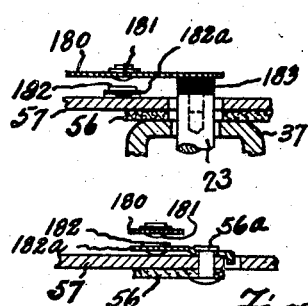
Fig. 10
Fig. 11
INVENTOR
Edward M. Claytor
BY
Spencer Hardman & Fehr
his ATTORNEYs Patented Sept. 28, 1943

2,330,407

UNITED STATES PATENT OFFICE 2,330,407

OVERDRIVE CONTROL SYSTEM

Edward M. Claytor, Anderson, Ind., assignor to General Motors Corporation, Detroit, Mich., a corporation of Delaware Application August 16, 1939, Serial No. 290,356

38 Claims. (Cl. 74—290)

This invention relates to electrically operated means for controlling the overdrive gearing for an automotive vehicle. One type of overdrive with which the present invention may be used is one in which a shaft transmitting power from the change speed gearing of the automobile may be connected with the propeller shaft for a 1 to 1 gear ratio drive or indirectly through planetary gearing of the overdrive by means of which the propeller shaft is caused to rotate faster than the drive shaft. The planetary gearing includes a sun gear which rotates with the drive shaft when the overdrive is not operative. To render the overdrive operative, the sun gear must be held stationary. In my copending application S. N. 241,917, filed November 23, 1938, I disclose an overdrive control in which the sun gear locking pawl is urged normally into locking position by a spring in which the locking pawl is retracted by the operation of a solenoid. In order to facilitate retraction of the sun gear locking pawl by the solenoid I provide a relay which opens the ignition circuit momentarily until the solenoid has completed its operation. The opening of the ignition circuit causes the engine to cease firing until the sun gear latch or pawl is withdrawn, whereupon the normal firing is reestablished.

The present invention relates more particularly with an overdrive controlled by a sun gear locking pawl which is actuated by the solenoid into locking position and by a spring out of locking position. The present invention is concerned with momentarily opening the ignition circuit during the time in which the sun gear locking pawl is retracted by spring operation. In one form of embodiment of my invention I control the time during which the ignition circuit is interrupted by means of electromagnetic relay which operates to maintain the ignition circuit open for a measured time after the solenoid circuit is interrupted. This measured time is controlled by the relay and is independent of the movement of retraction of the sun gear locking pawl. The time delay is greater than the time required under all normal conditions for the sun gear locking pawl to be withdrawn. In case the pawl is not retracted for any reason, such as failure of the return spring, the sticking of the pawl due to heavy, cold lubricant or due to excessive negative pressure as when going down a long grade, the relay completes the ignition circuit in any event.

In another form of embodiment of my invention I combine, with the time measuring relay, a switch actuated in response to the return of the pawl to fully retracted position for reestablishing the ignition circuit. In this way I am able to reduce the time during which the ignition is nonoperative to the minimum requirements while, at the same time, providing for the ultimate reestablishment of the ignition circuit in case of failure to retract the sun gear locking pawl.

Further objects and advantages of the present invention will be apparent from the following description, reference being had to the accompanying drawings wherein preferred embodiments of the present invention are clearly shown.

Figures 4, 5:
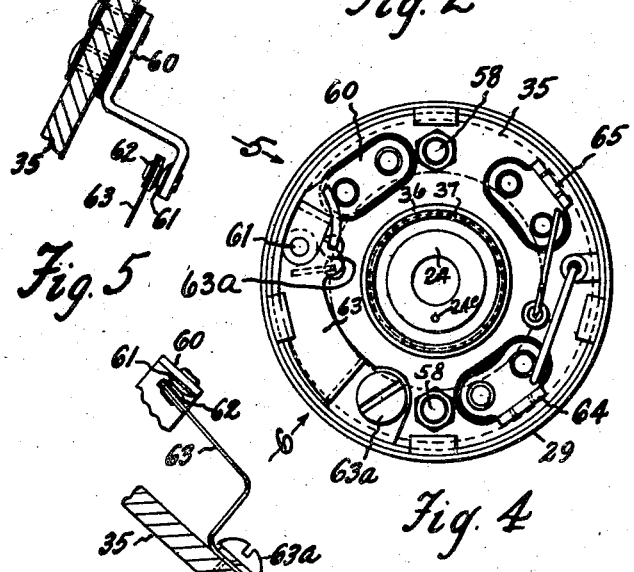
Fig. 4 is a view looking into the direction of the arrow 4 of Fig. 2 showing the assembly of solenoid magnet cup and cup cover plate carrying certain terminals and switch elements.
Figures 3, 6:
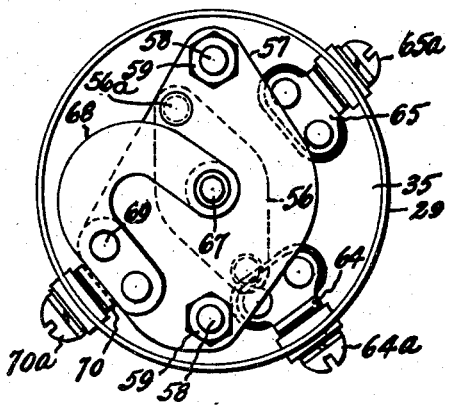
Fig. 3 is a view looking in the direction of the arrow 3 of Fig. 2, the solenoid cover being removed.

Figs. 5 and 6 are fragmentary views looking in the direction of the arrows 5 and 6 of Fig. 4.

Figure 7:
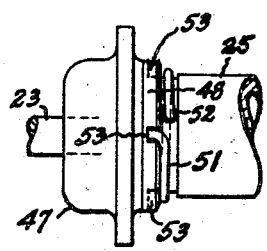

Fig. 7 is a fragmentary view of a portion of the solenoid armature and certain adjustable nuts associated therewith.

Fig. 8 is a wiring diagram showing a modified form of the invention.

Fig. 9 is a view similar to Fig. 3 showing modifications of construction necessary to take care of certain circuits shown in Fig. 8.

Figs. 10 and 11 are fragmentary sectional views taken on the lines 10—10 and 11—11 respectively of Fig. 9.

Figures 1, 1A:
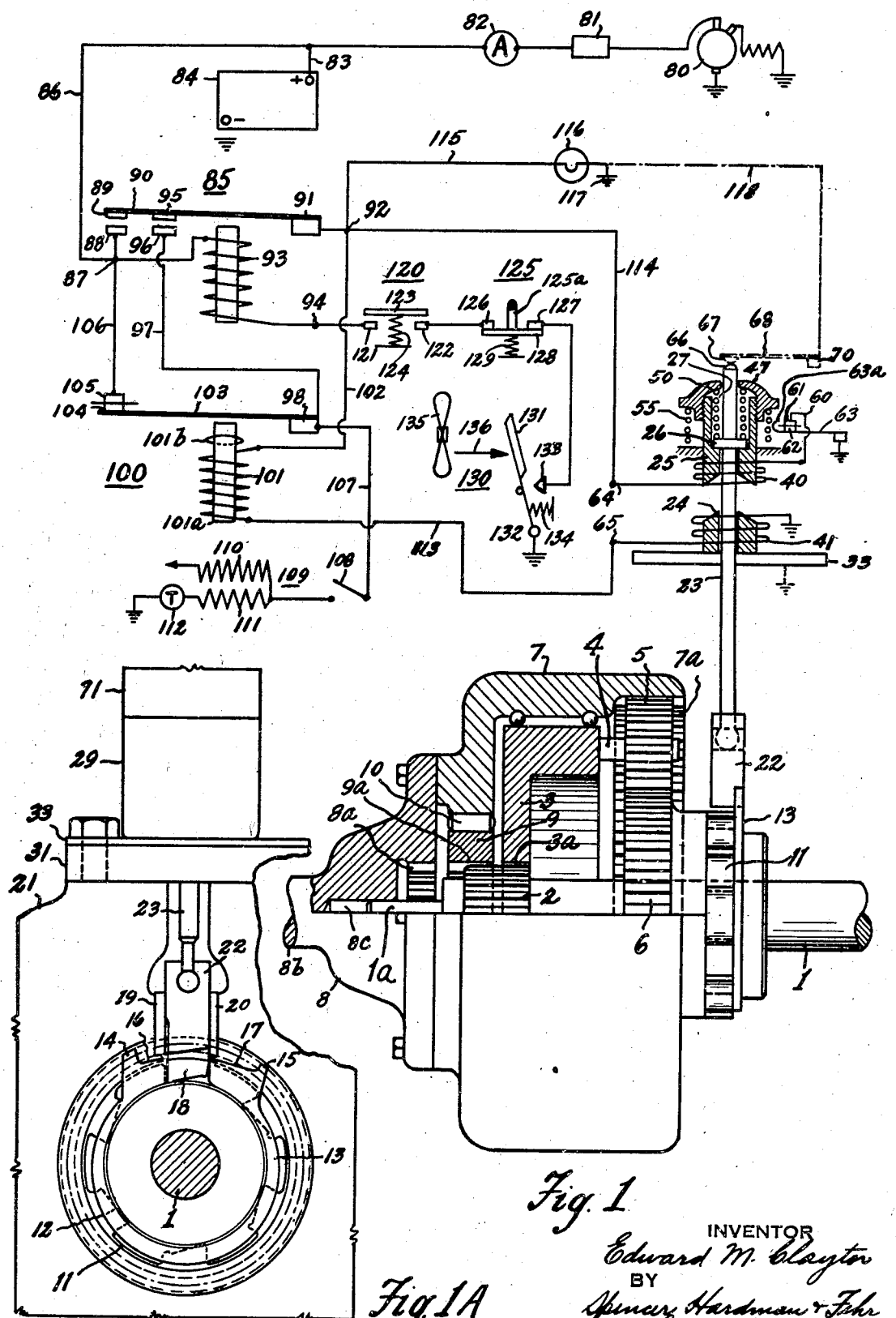
Fig. 1 shows a diagram of an overdrive to which the control of my present invention is applied, said control being illustrated by a wiring diagram forming a part of Fig. 1.
Fig. 1a is a diagram showing the sun gear locking pawl and pawl blocking member which has been moved to position to permit movement of the pawl into engagement with the sun gear locking ring.

Referring to Fig. 1, numeral 1 indicates the driving shaft of the overdrive mechanism. The shaft 1 receives its power from the change speed gear mechanism housed in a box which would be located between the overdrive mechanism and the engine clutch. The shaft 1 is provided with external splines 2 which mesh with internal splines 3a of the ring 3 and with internal splines 9a of the driving member of an overrunning clutch 9. The external splines 2 mesh also with internal splines 8a of a coupling member 8 to which the propeller shaft 8b may be attached. The splines 2 connect together the members 3 and 9 as shown in Fig. 1, when it is desired to use the overdrive mechanism. When it is not intended that the overdrive mechanism shall be used for any considerable period of time, the overdrive may be entirely disconnected by moving the shaft 1 endwise toward the left so that its external splines 2 will engage the internal splines 8a of the member 8, thus connecting together the members 8 and 9 and leaving the members 3 free. The shaft 1 is supported for axial movement at both ends. The support for the right hand end of the shaft 1 is not shown. At the left end of the shaft 1 it is provided with a reduced portion 1a having a sliding fit within an axially aligned recess 8c provided in the member 8.

The ring 3 carries a plurality of rods 4 each rotatively supporting a planet gear 5 which meshes with a sun gear 6 and with an internal ring gear 7a integral with ring 7, which cooperates with the clutch rollers 10, which in turn cooperate with a driving clutch cam 9 to receive transmission of torque from the driving member 1 at such time as the driving member 9 tends to rotate ahead of the member 7. However, when a ring 11 attached to the sun gear 6, is engaged by a sun gear locking pawl 22 which is received by one of a series of notches 12 in ring 11, the internal ring gear 7a and its ring 7 are driven at a speed exceeding the speed of the clutch driving member 9. Under these conditions the ring 7 will overrun the clutch driving member 9. The pawl 22 is normally maintained out of engagement with the ring 11 by a pawl rod 23 which is controlled in a manner to be described. Movement of the pawl 22 into engagement with the ring 11 is obstructed, except under certain conditions, by a blocker plate 13 which is frictionally dragged by ring 11. The blocker plate 13 is provided with stop lugs 14 and 15 which project beyond stop surfaces 16 and 17 which may be engaged under certain conditions by the pawl 22. The surfaces 16 and 17 are interrupted by a notch 18 of sufficient width to permit movement of the pawl 22 between the surfaces 16 and 17 when the notch 18 is brought into alignment with the pawl 22, as shown in Fig. 1a. The pawl 22 is guided between bosses 19 and 20 of the frame 21 of the overdrive mechanism. Bosses 19 and 20 project into the plane of the blocker plate 13 so as to be engaged by lugs 14 and 15, respectively. When the ring 11 rotates clockwise, the blocker plate 13 will be frictionally dragged clockwise until its lug 14 strikes the boss 19, and further movement of the blocker plate 13 in the clockwise direction will cease. When the ring 11 rotates counterclockwise, the blocker plate 13 will be frictionally dragged counterclockwise until its lug 15 engages the boss 20 whereupon counterclockwise movement of the plate 13 will cease. An explanation of the clockwise and counterclockwise movements of the ring 11 will be given in connection with the mode of operation of the control device which controls the overdrive gearing.

The sun gear locking pawl 22 is attached to a pawl rod 23 extending through a solenoid stationary core 24 and through a solenoid armature 25. Rod 23 has a shoulder portion 26 located within a recess 27 provided by the armature 25.

Figure 2:
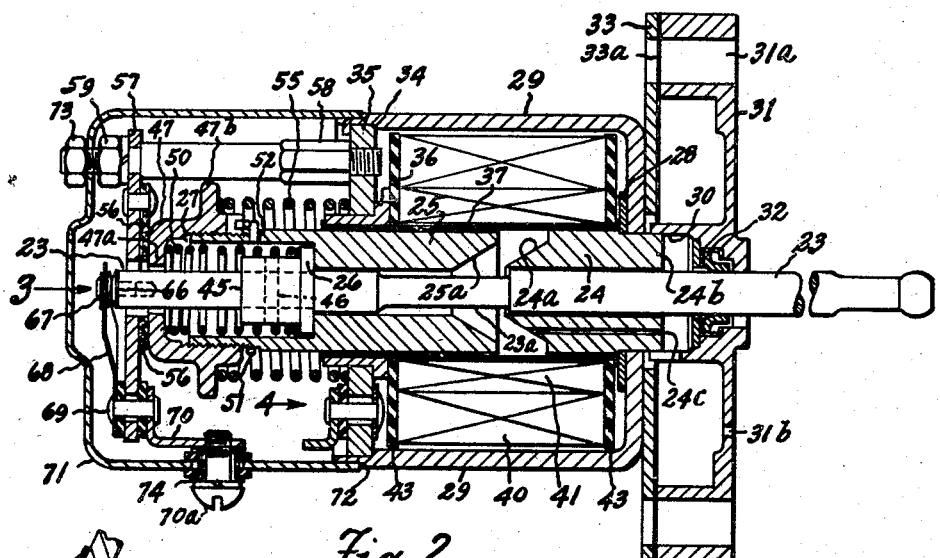
Fig. 2 is a longitudinal sectional view of the pawl controlling solenoid.

Referring also to Fig. 2 it will be seen that the solenoid core 24 extends through a magnetizable washer 28 and the end wall of the magnetizable solenoid cup 29. The right hand end portion of the core 24 provides a pilot extension 24b which is received by recess 30 in a bracket 31 which carries a packing unit 32 thru which the rod 23 is slidable. The cup 29 is attached to a mounting plate 33, which, together with the bracket 31 may be attached to the frame 21 of the overdrive by bolts, not shown, which pass thru the aligned holes 33a and 31a of the plate 33 and bracket 31. Parts 33, 29, 28 and 24 are welded together.

The cup 29 is counterbored at 34 to provide a shoulder against which there rests a cover plate 35 which is centrally apertured to receive a bushing 36. The bushing 36 and the plate 35 are of magnetizable material. The bushing 36 and the core 24 support a thin wall non-magnetizable tube 37 which supports the solenoid armature 25 for sliding movement toward or away from the core 24. The armature 25 is provided with a conical recess 25a and the core 24 with conical pole face extension 24a mating with the recess 25a. This construction places the air gap more nearly central with respect to the solenoid windings 40 and 41 which surround the tube 37 and which are confined between non-conducting washers 43 also supported by the tube 37. This armature and core construction provides greater sliding surface for the armature than would be had by the conventional construction of placing the conical recess in the core.

The shoulder member 26 for the rod 23 is provided by non-magnetizable bushing 45 secured to the rod by pin 46. The armature 25 has a threaded portion which receives an adjusting nut 47. The nut 47 is provided with an inwardly extending annular flange 47a against which bears one end of a spring 50, bearing at its other end against the shoulder portion 26 of the bushing 45. The initial compression of the spring 50 is obtained by the proper adjustment of the nut 47 which is locked in adjusted position by a single turn spring 51, see also Fig. 7, having one end received by a hole 52 provided by the armature 25 and the other end by one of a plurality of notches 53 provided by the nut 47. To unlock the nut 47 the spring 51 must be withdrawn from the notch 53. The position of the nut 47 along the armature 25 can be adjusted after an end of the spring 51 has been withdrawn from the notch 53 in the nut 47. By adjusting the nut 47 along the armature 25, the location of the rod 23 normally with respect to the stationary parts can be varied; therefore the normal position of the pawl 22 relative to the blocking member 13 can be varied.

A spring 55, surrounding the armature 25 and located between the flange 47b of the nut 47 and the plate 35 urges the nut 47 toward the left against a leather bumper plate 56 secured to a mounting plate 57 which is supported by a plurality of studs 58 threaded into the plate 35. Plate 57 is secured on studs 58 by nuts 59. Since the spring 55 urges the nut 47 into the position shown in Fig. 2, the armature 25 and the rod 23 are consequently held in the positions shown in Fig. 2.

The plate 35 insulatingly supports a bracket 60 carrying a contact 61 normally engaged by contact 62 carried by a resilient conductor 63 mounted directly upon the plate 35 and therefor grounded as indicated in Fig. 1 at the right.

The contact supporting member 63 has a projection 63a located in the path of movement of the flange 47b of nut 47. Bracket 60 is connected with one end of solenoid magnet winding 40, the other end of which is connected with an insulated terminal 64. The winding 40 which is composed of a relatively small number of turns of coarse wire is the main attracting coil of the solenoid. The winding 41 which is grounded at one end and connected at the other with an insulated terminal 65, is the holding coil of the solenoid. It comprises a relatively large number of turns of fine wire.

The rod 23 carries a contact button 66 engageable with a contact 67 mounted on the end of a resilient conductor 68 insulatingly supported on the plate 57 and joined by a rivet 69 with a bracket 70. These contacts and terminals are enclosed by a cover 71 the peripheral edge of which bear against a shoulder 72 provided by the shell 29. The cover 71 is secured in position by nuts 73 engaging the threaded ends of the studs 58. The brackets 64—65 and 70 respectively cooperate with wire attaching screws 64a—65a and 70a passing thru bushings 74 insulatingly supported by the cover 71.

The rod 23 which is magnetizable is provided with a neck or reduced portion 23a so that this portion of the rod 23 will become readily saturated with magnetic flux. This construction tends to prevent the straying of flux from the poles of core 24 and armature 25 and make the solenoid operate more efficiently. Freedom of movement of the armature 25 is provided by vent 24c in core 24 and vent 31b in bracket 31.

Referring to Fig. 1, a generator 80 is connected thru the reverse current relay 81 and an ammeter 82 and a wire 83 with a storage battery 84. Wire 83 is connected by wire 86 with a terminal 87 of a relay 85. Terminal 87 is connected with a stationary contact 88 adapted to be engaged by a normally separated contact 89 carried by an armature 90 fixed to a bracket 91 which is connected with a relay terminal 92. Terminal 87 is connected with relay magnet winding 93 connected with terminal 94. Armature 90 carries a contact 95 adapted to engage normally separated contact 96 connected by wire 97 with bracket 98 of a relay 100 having a magnet winding 101 connected by wire 102 with terminal 92 of relay 85. Winding 101 supports a core 101a cooperating with an armature 103 carrying a contact 104 normally engaging contact 105 connected by wire 106 with terminal 87 to relay 85. Bracket 98 of relay 100 is connected by wire 107 with ignition switch 108 connected with an ignition coil 109 having a secondary 110 and a primary 111 connected with grounded ignition timer 112. Winding 101 of relay 100 is connected by wire 113 with solenoid terminal 65. Solenoid terminal 64 is connected by wire 114 with terminal 92 of relay 85. Terminal 92 is connected by wire 115 with an indicator lamp 116 which may be grounded at 117. Instead of grounding the lamp 116 at 117 it may be connected with ground by wire 118 connecting the lamp 116 with terminal 70 of the solenoid unit. As the grounding of lamp 116 thru the solenoid unit is an alternative arrangement, wire 118 terminal 70 contact 68 and contact 67 are indicated by dot-dash lines in Fig. 1.

Terminal 94 of relay 85 is connected with a gear switch 120 having stationary contacts 121 and 122 adapted to be bridged by movable contact 123 held out of engagement with the stationary contacts by spring 124. The gear switch 120 is closed by mechanism which is actuated when the transmission gear shaft lever is in intermediate position or in high speed position. Switch 120 is connected with a kick switch 125 comprising stationary contacts 126 and 127 normally engaged by contact 128 held normally in contact closing position by a spring 129. The switch 125 is opened by a suitable pedal cooperating with switch actuating rod 125a. This pedal may be the engine accelerator pedal which causes the switch 125 to open by movement of accelerator pedal beyond wide open throttle position. Switch 125 is connected with ground thru a switch responsive to vehicle speed such as an air switch 130 having a grounded vane 131 pivoted at 132 and maintained normally out of engagement with contact 133 by the action of a spring 134. The vane 131 is moved into engagement with contact 133 by the action of an air current provided by the engine cooling fan 135 causing a current of air to impinge upon the vane 131 as indicated by the arrow 136.

The operation of the overdrive system illustrated by Fig. 1 is as follows: While the engine is running the ignition switch 108 will be closed. When the vehicle transmission is set for drive thru intermediate gears or high speed gears the switch 120 will be closed. When the vehicle speed maintains a certain value such as 25 m. p. h. for example, the air switch 130 will be closed. As stated before, switch 125 is normally closed. All three switches 120, 125 and 130 being closed, the winding 93 of relay 85 will receive current from the battery 84 thereby causing armature 90 to be attracted and contacts 89 and 95 to engage contacts 88 and 96 respectively. When this occurs solenoid magnet winding 40 will be connected with battery 84 through the circuit which includes wires 83 and 86, contacts 88 and 89, armature 90, bracket 91, terminal 92 wire 114, terminal 64, winding 40, contact bracket 60, contacts 61 and 62, contact arm 63. Through a branch circuit which includes terminal 92, wire 102 winding 101 of relay 100, wire 113, terminal 65, the solenoid winding 41 will be connected with battery 84. Both windings 40 and 41 cooperate to attract solenoid armature 25 toward solenoid core 24. As armature 25 goes downwardly it carries with it the nut 47 which forces the upper end of the spring 50 downwardly thereby tending to move the rod 23 downwardly.

When the solenoid is not excited, the spring 55, acting through the pawl rod 23, keeps pawl 22 out of engagement with the blocker plate 13. When the engine drives the transmission, the ring 11 moves counterclockwise as viewed in Fig. 1A and the plate 13 is frictionally dragged counterclockwise so that its lug 15 engages boss 20 thereby causing surface 17 to be in the path of movement of the pawl 22. When the engine speed is increased to the speed where the governor switch 130 closes, the hand controlled change speed gearing being in intermediate or high gear, the solenoid will be energized in the manner described. The pawl 22 is then urged downwardly by spring 50 and presses against surface 17. Engagement of the pawl 22 with the notched locking ring 11 is prevented until the speed of ring 11 is reduced to zero and the rotation of ring 11 reverses.

The reversal of ring 11 is effected by a reduction of engine speed (measured in miles per hour of vehicle speed) below vehicle speed by a predetermined amount dependent upon the gear ratio of overdrive to normal drive. For example, if the overdrive increases speed ratio between vehicle drive wheels and the engine by 30%, the engine speed must be reduced below vehicle speed by the amount of 30% of vehicle speed. Assuming the vehicle is being propelled through normal drive at 40 m. p. h. and it is desired to go into overdrive, the driver releases the accelerator pedal to permit engine speed to decrease. The vehicle "free wheels" (through overrunning clutch 9-10) at a speed starting at 40 m. p. h. and diminishing slightly due to resistance of wind and friction to about 35 m. p. h. Meanwhile the engine speed has diminished to 24 m. p. h., which speed is slightly more than 30% less than 35 m. p. h., the concurrent vehicle speed. As the engine speed decreases to 24 m. p. h., the speed of ring 11 is reduced to zero and then the ring 11 starts to reverse in direction of rotation or to move clockwise as viewed in Fig. 1A. As ring 11 begins to move slowly clockwise, it drags frictionally the blocker plate 13 clockwise thereby causing its lug 15 to move away from the boss 20 and its notch 18 to become aligned with pawl 22 thereby permitting spring 50 to press pawl 22 against a tooth of ring 11. As ring 11 continues to rotate, it brings a notch 12 into alignment with pawl 22 thereby permitting spring 50 to press pawl 22 into locking engagement with the ring 11 thereby locking sun gear 6. While the sun gear 6 is locked transmission of power from the shaft 1 to the shaft 8b takes place through the elements 2, 3a, 3, 4, 5, 7a, 7 and 8. The sun gear 6 being stationary, the ring gear 7a rotates faster than shaft 1. Since parts 9 and 7 are connected through a one-way clutch represented by the numeral 10, the ring 7 overruns the shaft 1 while the overdrive is affective.

During movement of the solenoid armature 25 the core 24 in order to preload the spring 50 so that it may push the pawl 22 into a notch 12 of the sun gear locking ring 11 when the blocker 13 is retracted, the flange 47b of nut 47 engages the projection of resilient contact 63 thereby separating contact 62 from contact 61 and breaking the circuit thru the main attracting coil 40 of the solenoid. The armature 25, being then in relatively close proximity with the core 24, is held in the attracted position by the holding coil 41.

The normally closed contacts 104 and 105 of relay 100 provide a connection between the battery 84 and the ignition switch 108, when the contacts of relay 85 are separated. When the contacts of relay 85 are closed, a by-pass circuit to the ignition switch 108 is completed around contacts 104 and 105 of relay 100. This by-pass starts from terminals 87 and includes contact 88 and 89, armature 90, contacts 95 and 96, wire 97 and bracket 98. While relay 85 is energized to maintain this by-pass, relay 100 is also energized to interrupt the connection to the ignition switch by separating contact 104 from contact 105.

When the driver desires to render the overdrive inoperative, he presses the kick switch rod 125a to interrupt the flow of current thru the relay winding 93 whereupon the armature 90 returns to normal position separating contacts 89 and 95 from contacts 88 and 96 respectively. This interrupts the flow of current thru the relay magnet 101 and the solenoid armature holding coil 41 thereby permitting relay 100 and the solenoid armature 25 to return to normal condition. When holding coil 41 is deenergized, spring 55, by operating thru the nut 47, and the nut 37, by operating on the shoulder 26 causes the pawl rod 23 and the pawl 22 to be restored to normal position shown in Fig. 1. During upward movement of the nut 47 the resilient contact support 63 is relieved by engagement of the flange 47b of the nut 47 thereby permitting the contact 62 to reengage the contact 61.

A predetermined time after the separation of the contacts of relay 85, the contact 104 of relay 100 returns into engagement with the contact 105. This predetermined time is measured or determined by the characteristics of the relay 100. The lag or time delay between the opening of contacts 95 and 96 of relay 85 and the closing of contacts 104 and 105 of relay 100 is effected by causing the armature 93 to seal against the core 101a of relay 90 when its contacts are open thereby making it necessary for the magnetic flux in the core 101a to diminish to substantially zero before the armature 103 is released. The decay of flux in the core 101a is retarded by a short circuited coil 101b. During this measured time interval between the opening of contacts 95 and 96 of relay 85 and the closing of contacts 104 and 105 of relay 100, current to the ignition coil 109 is interrupted, thereby eliminating the igniting of several fuel charges whereby the engine ceases to drive the vehicle and the torque reaction between the sun gear locking ring 11 and the pawl 22 is relieved in order to facilitate retraction of the pawl 22 by the spring 55.

If the signal lamp 116 is grounded at 117 and the circuit, shown in dot-dash lines thru the solenoid is omitted, the lamp 116 will burn as long as the relay 85 is closed. Under these circumstances the lamp 116 burns to indicate that the overdrive is operative. If the ground 117 is omitted and the circuit includes the parts indicated in dot-dash lines, the lamp 116 will burn to indicate that relay 85 is operative and therefore the solenoid armature 25 has been attracted to preload the pressure spring 50. When the driver releases the accelerator pedal to permit the vehicle to drive the engine and to effect the retraction of the blocker 13, then the pawl 22 will move into engagement with the sun gear locking ring 11. During such movement of the pawl 22, the circuit thru the signal lamp 116 will be interrupted by the separation of contacts 66 and 67. Therefore, when the circuit thru the signal lamp 116 omits the ground 117 and includes wire 118 and contacts 66 and 67, the burning of the lamp 116 indicates operation of the relay 85 to precondition the solenoid for overdrive operation, and the subsequent non-burning of the lamp 116 indicates that the overdrive has been rendered operative.

From the foregoing description of the construction and mode of operation of a control circuit embodying the first form of my invention it is apparent that I have provided electromagnetic means operating independent of the solenoid for causing the ignition circuit to be interrupted for a predetermined interval of time sufficient to enable the return spring 55 of the solenoid to operate to retract the pawl 22 while the torque reaction is relieved between the pawl 22 and the sun gear locking ring 11. In any event, the time delay afforded by the relay 100 is greater than the time required under all normal conditions for the retraction of the pawl 22. In case the pawl 22 is not retracted for any reason such as failure of the return spring 55, the relay 100 completes the ignition circuit.

Since it might be objectionable to some car drivers to allow the ignition circuit to remain interrupted longer than absolutely necessary for retraction of the sun gear locking pawl, I provide in the second form of my invention, illustrated by Figs. 8 to 11, the combination of a time measuring relay, which completes the ignition circuit in any event, and another switch for completing the ignition circuit in response to the complete retraction of the sun gear locking pawl.

Referring to Fig. 8 a storage battery 140 is connected with ground and with a wire 141 from which wire leads off to a green indicator lamp 142 connected with a terminal 143, and a wire leads off to a magnet winding 144 of a relay 145 said winding being connected also with terminal 143.

Wire 141 is connected with contact 151 of a relay 150 which, in this form of invention, is the time measuring relay. Contact 151 is normally engaged by a contact 152 carried by an armature 153 attached to support 154. The relay 150 includes a magnetizable core 155 surrounded by a magnet coil. 156 connected with wire 157 and with ground. The core 155 is surrounded by a single turn short circuited coil 158 for the purpose of retarding the delay of flux of the relay in order to delay the return of contact 152 into engagement with contact 151.

Relay 160 includes a magnet winding 161 connected with wire 141 and with a terminal 162. Winding 161 surrounds the core 163 which cooperates with an armature 164 attached to a support 165 and electrically connected with contacts 166 and 167 engageable, respectively, with stationary contacts 168 and 169. Contact 168 is connected with wire 141. Contact 169 is connected by wire 170 with support 154 of relay 150. Armature 164 insulatingly supports a bracket 171 carrying a contact 172 for engaging a contact 173 connected with wire 141. The bracket 171 is connected with wire 157. Armature bracket 165 of relay 160 is connected by wire 175 with the solenoid terminal 54 to which main attracting coil 40 is connected as was the case in Fig. 1. In Fig. 8 however, the holding magnet coil 41 is connected with the same terminal 54.

To the wire 175 is connected a red signal lamp 176 which is grounded. Lamp 176 burns to indicate operation of relay 160 and, therefore, operation of the solenoid unit. The terminal 162 of Fig. 8, which corresponds to terminal 84 of Fig. 1, is connected in series with the gear shift responsive switch 120, the accelerator pedal operated switch 125 and the vehicle speed responsive switch 130. The armature bracket 154 of relay 150 is connected by wire 177 with ignition switch 108. The terminal 143 is connected by wire 178 with a terminal 179 connected with a resilient switch arm 180 carrying a contact 181 for engaging a grounded contact 182. Contact 181 is normally held apart from the contact 182 due to the fact that the contact support 180 engages a nonconducting button 183 mounted on the upper end of the pawl rod 23. The terminal 179 corresponds in position to the terminal 70 of Fig. 3 and the resilient support 180, to the support 68 of Fig. 3. As shown in Figs. 10 and 11, contact 182 is mounted on a resilient support 182a which is directly attached to the plate 57 by the rivet 56a which secures the plate 57 and bumper plate 56 together.

The operation of the circuit shown in Fig. 8 is as follows: Before going into overdrive, switches 120 and 130 must be closed as in the case of the form of invention shown in Fig. 1. To go into overdrive the driver releases the accelerator pedal to permit a reversal of torque transmission in order that the blocking member 13 will move into position to permit the pawl 22 to enter a notch 12 of the sun gear locking ring 11.

The closing of the switches 120 and 130 establishes a circuit between the battery 140 and coil 161 of relay 160 thereby causing the armature 164 to move downwardly in order to establish connections between the pairs of contacts 172—173, 166—168 and 167—169. The closing of contacts 166—168 establishes a circuit from the battery to the coils 40 and 41 of the solenoid thereby causing the armature 25 to move downwardly toward the core 24 in order to preload the spring 50 which, when the blocking member 13 releases the pawl 22, causes the pawl 22 to engage the sun gear locking ring 11. During downward movement of the armature 25, the nut 47 engages contact arm 63 to separate contact 62 from contact 61 thereby interrupting the circuit of the main winding 40. Current, however, continues to flow thru the holding coil winding 41 thereby maintaining the armature 25 in proximity to the core 24 and the spring 50 under sufficient compression to maintain the pawl 22 in engagement with the sun gear locking ring 11.

The closing of contact 166 and 168 establishes a circuit to the red signal lamp 176 which indicates that current is flowing thru the solenoid windings 40 and 41 and, therefore, that the pawl rod 23 operating spring 50 is being pre-loaded for movement of the pawl 22 into sun gear locking position prior to the unblocking of the pawl. As soon as the pawl is unblocked by movement of the locking member 13, the pawl rod 23 will move downwardly under the action of spring 50 thereby permitting the closing of contacts 181 and 182 which establishes a circuit to the green signal light 142 the burning of which indicates that the overdrive has been established.

The closing of contacts 181 and 182 also establishes a circuit to the winding 144 of relay 145 thereby causing the opening of contacts 146 and 147. For purposes to be described later these contacts will remain open during overdrive and until the pawl 22 has been substantially completely retracted.

The closing of contacts 166—168 and 167—169 of relay 160 establishes a circuit to the ignition coil 109 paralleling a circuit provided by contacts 151 and 152 and armature 153 of the measured time relay 150. The movement of armature 164 of relay 160 which closes contacts 166—168 and 167—169 also closes contacts 172—173 thereby completing a circuit to winding 156 of measured time relay 150. Since relay 150 has its coil 156 fed from contacts 172 and 173 of relay 160, the ignition circuit remains unbroken during the operation of the system to establish the overdrive, because contacts 151 and 152 cannot open before contacts 172 and 173 close.

To come out of overdrive the car driver opens the switch 125 which may be controlled by movement of the accelerator pedal beyond wide open throttle position. The opening of switch 125 interrupts the circuit of the winding 161 of relay 160 whereupon armature 164 moves upwardly and all pairs of contacts of relay 160 are separated. There is therefore no ignition since at that time, the contacts of relay 150 and the contacts of relay 145 are also separated. Therefore there is no torque developed by the engine and the frictional resistance to the retraction of the sun gear locking pawl 22 is removed thereby permitting the spring 55 to operate as in the case of Fig. 1 to retract the pawl. As soon as the pawl 22 is fully retracted by upward movement of the rod 23 the contact 181 is separated from the contact 182, thereby interrupting the flow of current thru the green light 142 to indicate that the car is out of overdrive. The extinguishing of red light 176 indicates the operation of the system for the purpose of coming out of overdrive.

The opening of contacts 181 and 182 also causes deenergization of relay magnet winding 144 thereby permitting contacts 146 and 147 to close in order to reestablish the circuit between the battery 140 and the ignition coil 109. However at this instant the contacts of relay 150 are still open due to the fact that, altho the circuit of magnet winding 156 has been broken by the opening of the contacts 172 and 173 of relay 160, nevertheless there is a delay in the reclosing of these contacts 151 and 152. This delay is effected by an adjustment of relay 150 which allows the armature 153 to be sealed against the end of the core 155 when the armature 153 is attracted; and this delay may be effected also by retarding the decay of flux in core 155 by the short circuited coil 158. As was the case of relay 100 of Fig. 1, the measured time provided by relay 150 between the opening of switch 125 of the closing of contacts 151 and 152 is greater than the time required under all normal conditions for the sun gear locking pawl 22 to be retracted. In order that the ignition will not be interrupted any longer than necessary the relay 145, on becoming deenergized by the return of pawl rod 23 to uppermost position, permits the reestablishment of the ignition circuit by the closing of contacts 146 and 147. Obviously these contacts close ahead of the closing of contacts 151 and 152 of the measured time relay 150. However, in the circuit shown in Fig. 8, the relay 150 still serves a useful purpose since, in the event that the sun gear locking pawl were not retracted, due to failure of the return spring 55 for example, then the contacts of relay 145 would always remain open but the relay 150 would eventually step in to reestablish the ignition system so that the engine would operate although the car still remained in overdrive.

From the foregoing description of the construction and mode of operation of the disclosed embodiments of the present invention, it is apparent that I have provided the combination with a sun gear locking pawl normally held out of locking position by a spring of a solenoid for actuating the pawl into locking position, said solenoid being controlled automatically in response to vehicle speed and in response to movement of the transmission gear shift lever into intermediate or into high position, means under the control of the operator for rendering the solenoid inoperative and also for interrupting the power feed circuit of the ignition system so that conditions are produced which are favorable to the retraction of the pawl by the spring, and means for restoring the ignition to operative condition independent of any control by the driver and independent of any movement of the pawl to non-locking position. This last named means functions automatically to restore the ignition to operative condition a measured time interval after operation of the means which renders the solenoid inoperative. Since there is a time interval of appreciable duration between the rendering of the ignition inoperative and the restoration of the ignition to operative condition, I have brought about two separate instances where conditions are favorable to the retraction of the pawl from sun gear locking position by the pawl returning spring.

Let us first consider the instance where the ignition is rendered inoperative. It will be understood there is a certain amount of lost motion or side-play between the pawl 22 and the sides of a notch 12 of the locking ring 11. While the engine ignition is operative and the engine drives the vehicle, the torque transmitted by the engine to the vehicle drive wheels is what I term as positive torque. When the engine ignition is rendered inoperative, the vehicle tends to drive the engine and the transmission of torque is reversed. I designate this reversed torque as negative torque. When positive torque is present the pawl 22 will press against one side of a notch 12 and, when negative torque is present, the pawl 22 will press against the other side of the notch 12. It is obvious that, if the ignition is rendered inoperative causing the engine to cease to fire, the torque will change from positive to negative and the pawl 22 will move from a position where it presses against one side of the notch 12 to a position where it presses against the other side of the notch. During the period of time of relative side-wise movement between the notch 12 and the pawl 22 in which the pawl 22 relatively moves from one side of the notch 12 to the other, there is a condition where there is no binding force between the ring 11 and pawl 22 to resist withdrawal of the pawl 22 by the pawl return spring 55. This change from positive torque to negative torque produces a condition which is favorable to the retraction of the pawl 22 from the ring 11. Obviously the duration of this condition is relatively short, since it continues only long enough for the pawl to leave one side of the notch, traverse the lost motion space between the sides of the notch and then engage the opposite sides of the notch. Under some unusual circumstances, this period of short duration might not be sufficient for the pawl 22 to be completely withdrawn from the sun gear locking ring 11. However, another instance of favorable conditions for retraction of the pawl 22 by the spring 55 is afforded.

At the end of the measured time interval provided by relay 100 during which the ignition may be inoperative, there is another condition of no binding between the pawl 22 and ring 11 at the instant when the ignition apparatus is rendered operative, because there is another reversal of torque from negative torque to positive torque. Therefore, the present invention provides two instances which are favorable to the retraction of the pawl 22 of the sun gear locking ring 11. Therefore, there are two opportunities for the pawl 22 to be retracted.

While the embodiments of the present invention as herein disclosed, constitute preferred forms, it is to be understood that other forms might be adopted, all coming within the scope of the claims which follow.

What is claimed is as follows:

1. An overdrive control for automotive vehicles comprising the combination of a current source, a solenoid for controlling the sun-gear-locking pawl of an overdrive mechanism, a main control relay for controlling the circuit between the current source and the solenoid, engine ignition apparatus, a measured time relay having normally closed contacts controlling the circuit between the current source and the ignition apparatus said contacts being opened upon energization of the magnet coil of said measured time relay, normally open contacts closed by the main control relay and operative when closed to complete a circuit between the current source and ignition apparatus independently of the contacts of the measured time relay, normally open contacts closed by the main control relay and operative when closed to complete a circuit between the current source and the magnet coil of the measured time relay, and means for controlling the circuit between the current source and the magnet coil of the main control relay.

2. An overdrive control according to claim 1 in which the lag of the measured time relay is effected by having its relay armature seal against its core when the armature is attracted.

3. An overdrive control according to claim 1 in which the lag of the measured time relay is effected by providing its core with a short-circuited damper winding.

4. An overdrive control according to claim 1 in which the solenoid is provided with an armature main attracting coil and an armature holding coil and with a switch for open-circuiting the main-attracting coil in response to movement of the solenoid armature, and in which the holding coil of the solenoid is in series with the magnet coil of the measured time relay.

5. An overdrive control according to claim 1 in which a signal is provided to indicate operation of main control relay to effect operation of the solenoid.

6. An overdrive control for automotive vehicles comprising the combination of a current source, a solenoid for urging the sun-gear-locking-pawl of an over-drive mechanism into locking engagement with the sun-gear thereof, a main control relay for controlling the circuit between the current source and the solenoid, engine ignition apparatus, a measured time relay having normally closed contacts controlling the circuit between the current source and the ignition apparatus, said contacts being opened upon energization of the magnet coil of said measured time relay, normally open contacts closed by the main control relay and operative when closed to complete a circuit between the current source and ignition apparatus independent of the contacts of the measured time relay, normally open contacts closed by the main control relay and operative when closed to complete a circuit between the current source and the magnet coil of the measured time relay, a third relay having normally closed contacts parallelling the contacts of the measured time relay, said contacts being opened upon energization of the magnet coil of said third relay, a switch closed in response to movement of the latch into sun-gear-locking position for connecting the magnet coil of the third relay with the current source, and means for controlling the main control relay.

7. An overdrive control according to claim 6 in which a signal is provided to indicate operation of the main control relay to effect operation of the solenoid.

8. An overdrive control according to claim 6 in which a signal is provided to indicate that the pawl has locked the sun-gear.

9. An overdrive control according to claim 6 in which a signal lamp of one color burns to indicate operation of the main control relay to effect operation of the solenoid, and in which a signal lamp of another color burns to indicate that the pawl has locked the sun-gear.

10. An overdrive control for automotive vehicles comprising a pawl for locking the sun-gear of the overdrive mechanism, means for effecting actuation of the pawl, engine ignition apparatus, a current source, a normally closed switch for connecting the ignition apparatus with the current source, a normally open switch controlled by the means for effecting actuation of the pawl for paralleling the normally closed switch and operating when closed to connect the ignition apparatus with the current source independently of the normally closed contacts, a measured time relay for controlling the normally closed switch and having a magnet winding which, when energized, causes the opening of the normally closed contacts, and a switch controlled by the means for effecting actuation of the pawl for connecting the measured time relay magnet winding with the current source.

11. An overdrive control according to claim 10 which includes also means responsive to the retraction of the pawl from the overdrive sun gear for effecting completion of the ignition circuit independently of the operation of the measured time relay.

12. In an overdrive control for automotive vehicles which includes a pawl for locking the sun-gear of the overdrive mechanism, the combination with means for controlling the pawl of a normally open switch for connecting engine ignition apparatus with a current source, means for effecting the closing of the switch when the pawl is urged toward locking engagement with the sun gear, a normally open switch paralleling the normally closed switch also for connecting the ignition apparatus with the current source, a measured time relay for opening the normally closed switch and having a magnet winding, and means for connecting the magnet winding with the current source when the pawl is urged toward locking engagement with the sun gear, the first mentioned switch being opened and the circuit of the magnet winding being opened when the pawl is released for movement out of engagement with the sun gear.

13. The combination of claim 12 with the addition of a switch responsive to retraction of the pawl from the sun-gear for connecting the current source with the ignition apparatus.

14. In a system of controlling an overdrive for automotive vehicles, the combination of a magnetizable sun-gear locking-pawl rod a tubular magnetizable core and a tubular magnetizable armature through which the rod extends, said rod having a reduced portion in the region of the pole faces of the core and armature, electromagnetic windings for creating magnetic flux, the rod cooperating with the core and armature to minimize flux leakage, said reduced portion of the rod becoming saturated whereby a substantial part of the flux threading within the windings is caused to pass through the gap between the core and armature, and means for transmitting movement between the armature and rod.

15. The combination of claim 14 further characterized by including with the movement transmitting means a non-magnetizable member attached to the rod and adapted to bear against a portion of the armature.

16. The combination of claim 14 in which the armature is provided with an internal, frusto-conical pole face defining a recess for receiving an external frusto-conical pole face provided by the core, said pole faces providing an air gap located approximately centrally with respect to the windings.

17. In a system of controlling an overdrive for automotive vehicles, the combination of aligned, tubular, solenoid core and armature members, a sun-gear-locking-pawl rod extending through said members, electromagnet windings surrounding said members, a stop for limiting movement of the armature away from the core, a spring surrounding the armature for urging the armature against the stop, a spring within a tubular recess of the armature for imparting movement from the armature to the rod, and a common member adjustable along the armature and providing an operating connection between said springs and the armature, and between the armature and said limiting stop, adjustment of said common member varying the position of the rod normally with respect to the core.

18. The combination of claim 17 in which the common member is a nut threadedly adjustable along the armature and having shoulder portions engaging said springs.

19. The combination of claim 17 in which the common member is a nut threadedly adjustable along the armature and having an internal annular flange engaging the spring within the armature and having an external annular flange engaging the spring surrounding the armature.

20. The combination of claim 17 in which the electromagnet windings comprising a main energizing coil and an auxiliary or holding coil and in which a switch is provided for opening the circuit of the main coil, said switch having an operating member located in the path of movement of said common member.

21. The combination of claim 17 in which the armature limiting stop is provided by a plate supported by studs extending the frame work of the electromagnet which supports the core and armature.

22. The combination of claim 17 in which the armature limiting stop is provided by a plate supported by studs extending the frame work of the electromagnet which supports the core and armature and in which the plate carries a switch operated by the pawl rod for controlling a circuit of the system.

23. The combination of claim 17 in which the armature limiting stop is provided by a plate supported by studs extending the frame work of the electromagnet which supports the core and armature and in which the frame work of the electromagnet supports a switch having an operating member actuated by the common member.

24. In a system of controlling an overdrive for automotive vehicles, the combination of a base plate, a magnetizable cup attached to the base plate, the end wall of the cup being apertured, a tubular magnetizable core seated within said aperture, a non-magnetizable tube surrounding the core and extending beyond the cylindrical wall of said cup, magnet windings surrounding said tube, a magnetizable cover plate enclosing said windings and attached to the peripheral edge of the cup, a magnetizable bushing supported by the cover plate centrally thereof and supporting the non-magnetizable tube, a tubular, magnetizable armature member in said tube and extending outside said cup, a magnetizable sun-gear-locking-pawl rod extending through said core and armature, a nut threaded externally on said armature, studs extending parallel to the armature and supported by the cover plate, a second plate supported by the studs in spaced relation to the cover plate, said second plate providing a stop engaged by said nut, a spring surrounding the armature and confined between the nut and the cover plate, a spring within the armature and surrounding the rod and confined between the nut and a shoulder provided by the rod, a switch on the cover plate controlled by said nut and a switch on the stop plate controlled by said rod.

25. In apparatus for controlling an automobile overdrive having planetary gearing including a sun-gear, the combination comprising a sun-gear locking pawl, a spring normally holding the pawl in non-locking position, means for moving the pawl into locking position against the action of said spring, means for rendering the pawl moving means inoperative and for rendering the engine inoperative to apply torque to the overdrive to permit the spring to retract the pawl and for automatically restoring the engine torque after the lapse of a predetermined time interval independently of movement of the pawl to non-locking position.

26. In apparatus for controlling an automobile overdrive having planetary gearing including a sun gear, the combination comprising a sun-gear locking pawl, a spring normally holding the pawl in non-locking position, a solenoid for moving the pawl into locking position against the action of said spring, means under the control of the driver for rendering the solenoid inoperative and for causing the automobile engine ignition apparatus to be non-operative whereby the engine is inoperative to apply torque to the overdrive, and means independent of the driver for automatically restoring operation of the engine ignition apparatus after the lapse of a predetermined interval of time independently of movement of the pawl to non-locking position.

27. In apparatus for controlling the overdrive of an automotive vehicle propelled by an internal combustion engine having electrical ignition apparatus, the combination with the sun-gear of the overdrive mechanism of a sun-gear locking pawl, a spring normally holding the pawl in non-locking position, means for moving the pawl into locking position against the action of said spring, a current source for operating the ignition apparatus, means for rendering the pawl moving means inoperative and for disconnecting the ignition apparatus from the current source so as to render the engine inoperative to apply torque to the overdrive to permit the spring to retract the pawl and for automatically restoring the connection between the current source and the ignition apparatus after the lapse of a predetermined time interval independently of movement of the pawl to non-locking position.

28. In apparatus for controlling the overdrive of an automotive vehicle propelled by an internal combustion engine having an electrical ignition apparatus, the combination with the sun-gear of the overdrive mechanism of a sun-gear locking pawl, a spring normally holding the pawl in non-locking position, a solenoid for moving the pawl into locking position against the action of said spring, a current source for operating the ignition apparatus and solenoid, means for controlling the circuit between the current source and solenoid, and means for controlling connections between the current source and ignition apparatus and operating during a predetermined time interval after interruption of the solenoid circuit to maintain the ignition circuit open so as to render the engine inoperative to apply torque to the overdrive to permit the spring to retract the pawl and finally operating to close the ignition circuit.

29. In apparatus for controlling the overdrive of an automotive vehicle propelled by an internal combustion engine having electrical ignition apparatus, the combination with the sun-gear of the overdrive mechanism of a sun-gear locking pawl, a spring normally holding the pawl in non-locking position, a solenoid for moving the pawl into locking position against the action of said spring, a current source for operating the ignition apparatus and solenoid, means for concurrently opening and closing a circuit between the current source and solenoid and a circuit between the current source and ignition apparatus, and means rendered operative by said first means for opening a circuit between the current source and ignition apparatus and operating for a predetermined time interval after the actuation of said first means into circuit-opening position for maintaining the ignition circuit open so as to render the engine inoperative to apply torque to the overdrive to permit the spring to retract the pawl and finally operating to close the ignition circuit.

30. In apparatus for controlling the overdrive of an automotive vehicle propelled by an internal combustion engine having electrical ignition apparatus, the combination with the sun-gear of the overdrive mechanism of a sun-gear locking pawl, a spring normally holding the pawl in non-locking position, a solenoid for moving the pawl into locking position against the action of said spring, a current source for operating the ignition apparatus and solenoid, means for concurrently opening and closing a circuit between the current source and solenoid and a circuit between the current source and ignition apparatus, and a relay switch rendered operative by said first means for opening a circuit between the current source and ignition apparatus and having time lag provisions which delay the closing of the relay switch until after a predetermined lapse of time subsequent to the actuation of the first named means into circuit-opening position.

31. A system of control for automobile overdrives comprising the combination of a current source, a solenoid for controlling operation of the overdrive mechanism, engine ignition apparatus operated by the current source, a controller, a normally closed ignition circuit-making device, electrically operated means connectible with said current source for opening said ignition-circuit-making device and having provisions for delaying the reclosing of said device when said means is disconnected from the current source, means responsive to the operation of the controller into one position for causing the current source to be connected with the solenoid and with the ignition apparatus independently of said normally closed ignition circuit-making device and with the electrical means for opening said normally closed ignition circuit-making device.

32. A system of control for automobile overdrives comprising the combination of a current source, a solenoid for controlling operation of the overdrive mechanism, engine ignition apparatus operated by the current source, a controller, a normally closed ignition-circuit-making device, electromagnetic means connectible with the current source for opening said ignition circuit-making device and having provisions for retarding the decay of magnetic flux of said electromagnetic means when said electromagnetic means is disconnected from the current source, means responsive to the operation of the controller into open position for causing the current source to be connected with the solenoid and with the ignition apparatus independently of said normally closed ignition circuit-making device and with the electromagnetic means.

33. A system of control for automobile overdrives comprising the combination of a current source, a solenoid for controlling operation of the overdrive mechanism, engine ignition apparatus operated by the current source, a control circuit, and electromagnetic means including a pair of normally open contacts for connecting the current source with the solenoid when the control circuit is completed and including a pair of normally closed contacts for controlling the ignition apparatus, and having provisions for delaying the return of the ignition controlling contacts to closed status for a predetermined time following the opening of the control circuit.

34. A system of control for automobile overdrives comprising the combination of a current source, a solenoid for controlling operation of the overdrive mechanism, engine ignition apparatus operated by the current source, a control circuit, an electromagnetic relay rendered operative by the closing of the control circuit for connecting the solenoid with the current source, and an electromagnetic relay operating contacts for controlling the ignition apparatus, said last named relay being energized in response to operation of the first relay, and said last named relay having provisions for delaying the return of the ignition controlling contacts to normal status for a predetermined time following the opening of the control circuit.

35. A solenoid mechanism for use with a motor vehicle transmission mechanism having planetary gearing including a sun gear and, a control mechanism for said sun gear comprising a pawl shiftable to and from a projected position wherein it is adapted to hold said sun gear against rotation to a retracted position wherein the sun gear is free to rotate, said solenoid mechanism including aligned tubular core and armature members, an operating rod extending through said members, coupled at one end to said pawl, and having a head adapted to be engaged by the armature during retraction thereof for retracting the pawl, said armature having a tubular recess receiving said head, a spring in said recess, operatively interposed between the armature and said head, for yieldingly urging the rod in pawl projecting direction under energized action of the armature, and a spring acting against the armature for retracting the same.

36. A solenoid for use with a motor vehicle transmission mechanism having planetary gearing including a sun gear and a shiftable element operable to hold or release said sun gear, said solenoid comprising aligned tubular core and armature members, an operating rod extending through said members, coupled at one end to said element and having a head adapted to be engaged by the armature for transmitting movement from the armature to said rod, said armature having a tubular recess receiving said head, a spring in said recess, operatively interposed between the armature and said head, and adapted to yieldingly transmit movement through said rod to said element so as to move the latter in one direction when the solenoid is energized, and a coil spring encircling the armature for moving said element in the opposite direction when the solenoid is deenergized.

37. A solenoid for use with a motor vehicle transmission mechanism having planetary gearing including a sun gear and a shiftable element operable to hold or release said sun gear, said solenoid comprising aligned tubular core and armature members, said armature being located adjacent the end of the core remote from said element of the transmission and provided with a recess, an operating rod extending through the core and into the recess of the armature and attached at one end to said element, a spring in the armature recess for yieldingly transmitting motion from the armature to the rod to cause said element to move in one direction when the solenoid is energized and the armature moves toward the core, a spring located adjacent the armature for moving it away from the core when the armature is deenergized, and means for transmitting motion from the armature to the rod to move said element in the other direction.

38. A solenoid for use with a motor vehicle transmission mechanism having planetary gearing including a sun gear and a shiftable element operable to hold or release said sun gear, said solenoid comprising aligned tubular core and armature members, said armature being located adjacent the end of the core remote from said element of the transmission and provided with a recess, an operating rod extending through the core and into the recess of the armature and attached at one end to said element and having an abutment member located in the recess and engaged on one side by the armature when the armature moves away from the core, a spring located adjacent the armature for moving it and the rod and the element into sun gear releasing position when the solenoid is deenergized, and a spring in the armature recess operatively interposed between the armature and the other side of the abutment member of said rod and adapted yieldingly to transmit movement through the rod to said element to move said element into sungear holding position when the solenoid is energized.

EDWARD M. CLAYTOR.